(12) United States Patent
Tang et al.

(10) Patent No.: US 11,742,648 B2
(45) Date of Patent: Aug. 29, 2023

(54) ONLINE ICE MELTING APPARATUS

(71) Applicant: QINGYUAN POWER SUPPLY BUREAU OF GUANGDONG POWER GRID CORPORATION, Guangdong (CN)

(72) Inventors: Xiaoliang Tang, Guangdong (CN); Fang Yang, Guangdong (CN); Yabing Zhou, Guangdong (CN); Weibin Jiang, Guangdong (CN); Kaihong Li, Guangdong (CN)

(73) Assignee: QINGYUAN POWER SUPPLY BUREAU OF GUANGDONG POWER GRID CORPORATION, Guangdong (CN)

( * ) Notice: Subject to any disclaimer, the term of this patent is extended or adjusted under 35 U.S.C. 154(b) by 0 days.

(21) Appl. No.: 17/911,417

(22) PCT Filed: Aug. 10, 2020

(86) PCT No.: PCT/CN2020/108167
§ 371 (c)(1),
(2) Date: Sep. 13, 2022

(87) PCT Pub. No.: WO2021/227268
PCT Pub. Date: Nov. 18, 2021

(65) Prior Publication Data
US 2023/0128839 A1    Apr. 27, 2023

(30) Foreign Application Priority Data
May 11, 2020   (CN) ......................... 202010393956.8

(51) Int. Cl.
*H02G 7/16*   (2006.01)
*H05B 3/00*   (2006.01)

(52) U.S. Cl.
CPC .............. *H02G 7/16* (2013.01); *H05B 3/0004* (2013.01); *H05B 3/0023* (2013.01); *H05B 2214/02* (2013.01)

(58) Field of Classification Search
CPC ...... H02G 7/16; H05B 1/0227; H05B 3/0004; H05B 3/0014; H05B 3/0019; H05B 3/0023; H05B 2214/02
(Continued)

(56) References Cited

U.S. PATENT DOCUMENTS 4,082,962 A *  4/1978  Burgsdorf ................ H02G 7/16
                                               219/209
4,085,338 A *  4/1978  Genrikh ................... H02G 7/16
                                               219/209
(Continued)

FOREIGN PATENT DOCUMENTS

CN       201174575 Y     12/2008
CN       201266837 Y      7/2009
(Continued)

OTHER PUBLICATIONS

International Search Report for CN2020/108167, dated Jan. 29, 2021, 5 pages.
(Continued)

*Primary Examiner* — Zachary L Kuhfuss
(74) *Attorney, Agent, or Firm* — Reising Ethington P.C.

(57) ABSTRACT

Provided is an on-line ice-melting apparatus. The apparatus is configured for melting the ice on a three-phase line. The apparatus includes an adjustable reactor, a grounding transformer, a controller, and an auxiliary circuit. The grounding transformer, the adjustable reactor, the auxiliary circuit, and a line of any phase of the three-phase line form a first control loop. The adjustable reactor includes a working winding, a control winding, and a short-circuit winding. The working
(Continued)

winding is connected between the grounding transformer and the auxiliary circuit. The controller is electrically connected to the control winding and the short-circuit winding separately.

10 Claims, 4 Drawing Sheets

(58) Field of Classification Search
USPC .......................................... 307/147; 219/209
See application file for complete search history.

(56) References Cited

U.S. PATENT DOCUMENTS

| | | | | |
|---|---|---|---|---|
| 4,119,866 A | * | 10/1978 | Genrikh | H02G 7/16 219/209 |
| 4,126,792 A | * | 11/1978 | Genrikh | H02G 7/16 219/209 |
| 4,135,221 A | * | 1/1979 | Genrikh | H02G 7/16 219/209 |
| 6,018,152 A | * | 1/2000 | Allaire | H02G 7/16 219/486 |
| 6,396,172 B1 | * | 5/2002 | Couture | H02G 7/20 219/501 |
| 6,727,604 B2 | * | 4/2004 | Couture | H02G 7/20 307/147 |
| 8,264,102 B2 | * | 9/2012 | Sadek | H02G 7/16 361/602 |
| 8,907,255 B2 | * | 12/2014 | Bellegarde | B60M 3/00 219/486 |
| 9,972,988 B2 | * | 5/2018 | Fu | H02G 7/16 |
| 2003/0006652 A1 | * | 1/2003 | Couture | H02G 7/20 307/112 |
| 2010/0033028 A1 | * | 2/2010 | Sadek | H02G 7/16 363/126 |
| 2012/0067850 A1 | * | 3/2012 | Bellegarde | H02G 7/16 219/68 |
| 2015/0042176 A1 | * | 2/2015 | Fu | H02J 3/02 307/113 |
| 2016/0072267 A1 | * | 3/2016 | Fu | H02M 1/32 219/488 |

FOREIGN PATENT DOCUMENTS

| | | |
|---|---|---|
| CN | 201466720 U | 5/2010 |
| CN | 102227074 A | 10/2011 |
| CN | 205160008 U | 4/2016 |
| CN | 206575155 U | 10/2017 |
| CN | 109119933 A | 1/2019 |
| CN | 111431125 A | 7/2020 |
| JP | 2007166836 A | 6/2007 |
| RU | 2376692 C1 | 12/2009 |
| RU | 2009119607 A | 12/2010 |

OTHER PUBLICATIONS

Chinese Office Action for CN application No. 202010393956.8, dated Dec. 15, 2020, 12 pages.
Decision to Grant a Patent for CN application No. 202010393956.8, dated Mar. 18, 2021, 3 pages.

* cited by examiner

ONLINE ICE MELTING APPARATUS

CROSS-REFERENCES TO RELATED APPLICATIONS

This is a National Stage Application, filed under 35 U.S.C. 371, of International Patent Application No. PCT/CN2020/108167, filed on Aug. 10, 2020, which is based on and claims priority to Chinese Patent Application No. 202010393956.8 filed with the China National Intellectual Property Administration (CNIPA) on May 11, 2020, the disclosure of which is incorporated herein by reference in its entirety.

TECHNICAL FIELD

The present application relates to the technical field of line ice melting, for example, an online ice melting apparatus.

BACKGROUND

With the increasing demand for power utilization and the rapid development of power system technology, power transmission lines have become increasingly bulky. The icing on a power transmission line may cause a major hazard to the power transmission in a power grid. Accordingly, the line ice melting technology has become the emphasis and difficulty in the prevention and treatment of ice disasters in the power grid.

In the related art, the alternate-current short-circuit ice melting method is generally used. In this method, an ice melting current is transmitted to a line through a medium-voltage distribution apparatus. Moreover, the heat generated by the short-circuit current helps melt the ice on the line. However, to perform this method, a power failure occurs in the line during the ice melting period, causing huge losses due to the power outage and affecting the safety of the power transmission line.

SUMMARY

The present application provides an online ice melting apparatus so that the reactance of a working winding is adjusted by using a controller to implement the coarse adjustment of the reactance of a short-circuit winding and the fine adjustment of the reactance of a control winding, thereby adjusting the current of a first control loop so as to achieve the effect of no power outage when the ice on a power transmission line is melted.

Embodiments of the present application provide an online ice melting apparatus. The apparatus is configured for melting the ice on a three-phase line. The apparatus includes an adjustable reactor, a grounding transformer, a controller, and an auxiliary circuit.

The grounding transformer is electrically connected to the three-phase line and a first terminal of the adjustable reactor separately. The auxiliary circuit is connected between a second terminal of the adjustable reactor and a line of any phase of the three-phase line. The grounding transformer, the adjustable reactor, the auxiliary circuit, and the line of any phase of the three-phase line form a first control loop.

The adjustable reactor includes a working winding, a control winding, and a short-circuit winding. The working winding is connected between the grounding transformer and the auxiliary circuit. The controller is electrically connected to the control winding and the short-circuit winding separately. The controller is configured for adjusting the reactance value of the control winding and/or the reactance value of the short-circuit winding and adjusting the reactance value of the working winding so as to control the current of the first control loop.

The present application provides an online ice melting apparatus. The apparatus is configured for melting the ice on a three-phase line. The apparatus includes an adjustable reactor, a grounding transformer, a controller, and an auxiliary circuit. The grounding transformer is electrically connected to the three-phase line and a first terminal of the adjustable reactor separately. The auxiliary circuit is connected between a second terminal of the adjustable reactor and a line of any phase of the three-phase line. The grounding transformer, the adjustable reactor, the auxiliary circuit, and the line of any phase of the three-phase line form a first control loop. The adjustable reactor includes a working winding, a control winding, and a short-circuit winding. The working winding is connected between the grounding transformer and the auxiliary circuit. The controller is electrically connected to the control winding and the short-circuit winding separately. The controller is configured for adjusting the reactance value of the control winding and/or the reactance value of the short-circuit winding and adjusting the reactance value of the working winding so as to control the current of the first control loop. Accordingly, the reactance of the working winding is adjusted by using the controller to implement the coarse adjustment of the reactance of the short-circuit winding and the fine adjustment of the reactance of the control winding, thereby adjusting the current of the first control loop so as to achieve the effect of no power outage when the ice on a power transmission line is melted.

DETAILED DESCRIPTION

Figure 1:
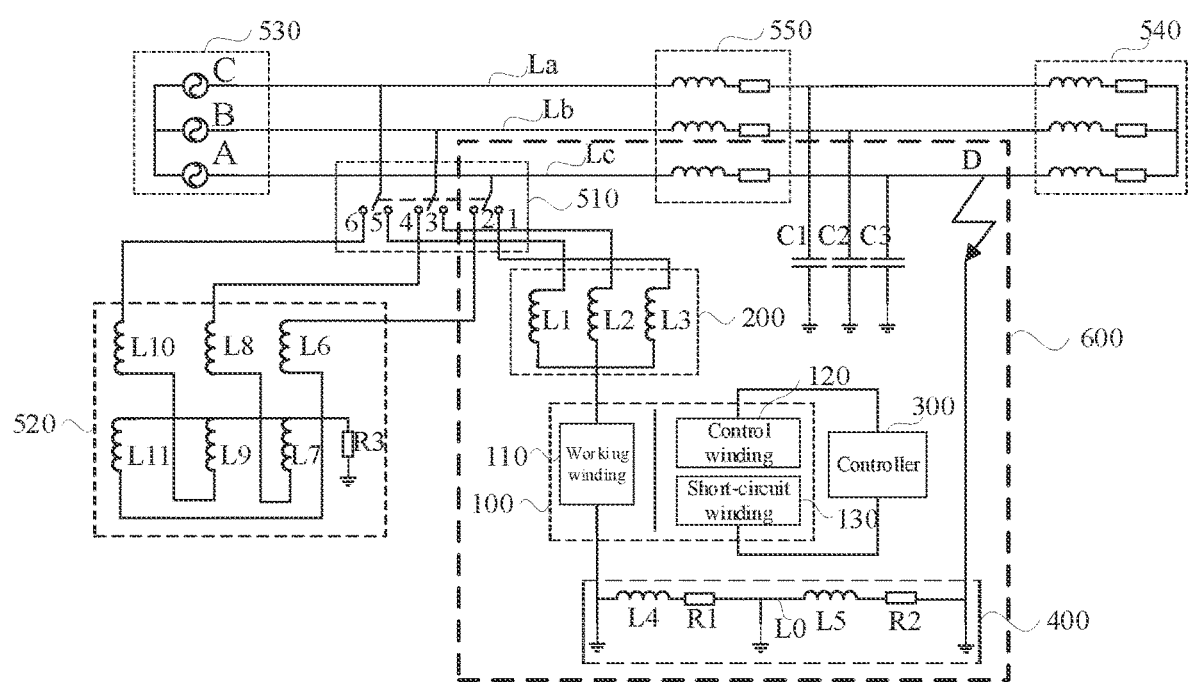
FIG. 1 is a diagram illustrating the structure of an online ice melting apparatus according to embodiment one of the present application.

Various ice melting methods in the related art are described roughly as below.

(1) A dispatch-based ice melting method. The dispatch-based ice melting method is mainly implemented through power dispatching. Specifically, the power flow distribution of a power system is changed, the current on an ice-coated line is increased, and thus the heat of the ice-coated line is increased to melt ice. This method is actually the most convenient deicing means. However, since having been limited by the conditions of power equipment such as transformer capacity, this method cannot fundamentally solve the problems. Accordingly, this method may be applied only in the initial stage of line icing and may generate only a certain mitigation effect.

(2) An alternate-current short-circuit ice melting method. In the alternate-current short-circuit ice melting method, an ice-melting short-circuit line is installed on a point of a power transmission line, then an ice-melting current is transmitted to the line through a medium-voltage distribution apparatus, and the heat generated by the short-circuit current helps melt the ice on the line. The alternate-current short-circuit ice melting method may be a three-phase short-circuit ice melting method or a two-phase short-circuit ice melting method. This method may be performed normally within a preset voltage range. However, for a line whose voltage level is greater than or equal to 500 kV, this method is not feasible since it is difficult to satisfy the high-capacity ice melting power supply.

(3) A direct-current ice melting method. In this method, an alternate-current power supply is converted into a direct-current power supply through a current conversion apparatus and an ice-coated line is heated to melt the ice on the line. However, a six-pulse-wave rectification apparatus or a twelve-pulse-wave rectification apparatus is usually used in direct-current ice melting. The six-pulse-wave rectification apparatus may introduce the fifth harmonic and the seventh harmonic. The twelve-pulse-wave rectification apparatus may introduce the eleventh harmonic and the thirteenth harmonic.

(4) A mechanical deicing method. The ice on a line is destroyed through the driving force generated by an automatic mechanical apparatus so that the ice is released from the line. This method has the advantages of convenience and ease of use but also has the disadvantages of low efficiency and poor safety. The related alternate-current ice melting technology may be roughly categorized into the types below.

(5) An online ice melting method based on a single-phase grounding fault. In this method, an arc suppression coil is configured in the under-compensation state and the current is adjusted by adjusting the degree of under-compensation. Since the single-phase grounding fault may operate with electricity for 2 hours, the power supply may not be interrupted. However, this method is very easy to generate parallel resonance, so that a power grid is in the failure state. Additionally, when the weather is relatively cold, the resistance of the earth is changing; accordingly, the capacity of the arc suppression coil cannot be accurately determined.

In the related line ice melting technology, the alternate-current short-circuit ice melting method is the most economical and effective method. However, the alternate-current short-circuit ice melting method is mainly aimed at main network lines. Distribution network lines are widely distributed with a great number of branches and complicated types of lines, are located in harsh terrain and climate conditions, and mostly pass through the micro-topographic and micro-climatic regions that are easily coated with ice. Accordingly, the distribution network lines have become a difficulty in the prevention and treatment of ice disasters. Additionally, the related current ice-melting technology is difficult to apply directly to the anti-icing of a distribution network. For a long time, the anti-icing of the distribution network lines is mainly based on the method of manual deicing. The low deicing efficiency and the high labor intensity make the distribution network lines weak in resisting rain, snow, and ice disasters, the reliability of supplying power to users is difficult to be guaranteed.

The present application provides an online ice melting apparatus, so that the reactance of a working winding is adjusted by using a controller to implement the coarse adjustment of the reactance of a short-circuit winding and the fine adjustment of the reactance of a control winding, thereby adjusting the current of a first control loop so as to achieve the effect of no power outage when the ice on a power transmission line is melted.

Embodiment One

FIG. 1 is a diagram illustrating the structure of an online ice melting apparatus according to embodiment one of the present application. Referring to FIG. 1, the apparatus is configured for melting the ice on a three-phase line. The apparatus includes an adjustable reactor 100, a grounding transformer 200, a controller 300, and an auxiliary circuit 400.

The grounding transformer 200 is electrically connected to the three-phase line and a first terminal of the adjustable reactor 100 separately. The auxiliary circuit 400 is connected between a second terminal of the adjustable reactor 100 and a line of any phase of the three-phase line. The grounding transformer 200, the adjustable reactor 100, the auxiliary circuit 400, and the line of any phase of the three-phase line form a first control loop 600.

Referring to FIG. 1, the three-phase line includes a first-phase line La, a second-phase line Lb, and a third-phase line Lc. The auxiliary circuit 400 is connected between the second terminal of the adjustable reactor 100 and the third-phase line Lc. The grounding transformer 200, the adjustable reactor 100, the auxiliary circuit 400, and the third-phase line Lc form the first control loop 600. Optionally, the auxiliary circuit 400 is connected between the second terminal of the adjustable reactor 100 and the first-phase line La. The grounding transformer 200, the adjustable reactor 100, the auxiliary circuit 400, and the first-phase line La form the first control loop 600. It may also be that the auxiliary circuit 400 is connected between the second terminal of the adjustable reactor 100 and the second-phase line Lb. The grounding transformer 200, the adjustable reactor 100, the auxiliary circuit 400, and the second-phase line Lb form the first control loop 600.

The adjustable reactor 100 includes a working winding 110, a control winding 120, and a short-circuit winding 130. The working winding 110 is connected between the grounding transformer 200 and the auxiliary circuit 400. The controller 300 is electrically connected to the control winding 120 and the short-circuit winding 130 separately. The controller 300 is configured for adjusting the reactance value of the control winding 120 and/or the reactance value of the short-circuit winding 130 and adjusting the reactance value of the working winding 110 so as to control the current of the first control loop 600.

The configuration in which the controller 300 is configured for adjusting the reactance value of the control winding 120 and/or the reactance value of the short-circuit winding 130 and adjusting the reactance value of the working winding 110 so as to control the current of the first control loop 600 may include the following. The controller 300 adjusts the reactance value of the short-circuit winding 130 first and the reactance of the working winding 110 varies with the reactance of the short-circuit winding 130, thereby implementing the coarse adjustment of the current of the first control loop. Then, the controller 300 adjusts the reactance of the control winding 120 and the reactance of the working winding 110 varies with the reactance of the control winding 120, thereby implementing the fine adjustment of the current of the first control loop.

In the technical solutions of this embodiment, the implementation process of the online ice melting apparatus is described as follows. Referring to FIG. 1, when the ice on the third-phase line Lc needs to be melted, the grounding transformer 200 is connected to the three-phase line; a switch on the third-phase line Lc may be configured for controlling a connection point D between the third-phase line Lc and the auxiliary circuit 400 to be connected so that the auxiliary circuit 400 is connected between the second terminal of the adjustable reactor 100 and the third-phase line Lc, thereby enabling that the grounding transformer 200, the adjustable reactor 100, and the line of any phase of the three-phase line form the first control loop 600. The first terminal of the adjustable reactor 100 is electrically connected to the grounding transformer 200, the second terminal of the adjustable reactor 100 is electrically connected to the auxiliary circuit 400, the grounding transformer 200, the adjustable reactor 100, the auxiliary circuit 400, and the third-phase line Lc form the first control loop 600; the controller 300 adjusts the reactance value of the short-circuit winding 130 first and the reactance of the working winding 110 varies with the reactance of the short-circuit winding 130, thereby implementing the coarse adjustment of the current of the first control loop; then the controller 300 adjusts the reactance of the control winding 120 and the reactance of the working winding 110 varies with the reactance of the control winding 120, thereby implementing the fine adjustment of the current of the first control loop. Similarly, when the ice on the first-phase line La, the ice on the second-phase line Lb, or the ice on another line needs to be melted, the grounding transformer 200 is connected to the three-phase line; a switch on the first-phase line La, a switch on the second-phase line Lb, or a switch on another line may be configured for controlling a connection point between the corresponding line and the auxiliary circuit 400 to be connected so that the auxiliary circuit 400 is connected between the second terminal of the adjustable reactor 100 and the corresponding line whose ice is to be melted, thereby enabling that the grounding transformer 200, the adjustable reactor 100, the auxiliary circuit 400, and the corresponding line whose ice is to be melted form the first control loop. Then, online melting is implemented for the line whose ice is to be melted according to the preceding implementation process.

The present application provides an online ice melting apparatus. The apparatus is configured for melting the ice on a three-phase line. The apparatus includes an adjustable reactor, a grounding transformer, a controller, and an auxiliary circuit. The grounding transformer is electrically connected to the three-phase line and a first terminal of the adjustable reactor separately. The auxiliary circuit is connected between a second terminal of the adjustable reactor and a line of any phase of the three-phase line. The grounding transformer, the adjustable reactor, the auxiliary circuit, and the line of any phase of the three-phase line form a first control loop. The adjustable reactor includes a working winding, a control winding, and a short-circuit winding. The working winding is connected between the grounding transformer and the auxiliary circuit. The controller is electrically connected to the control winding and the short-circuit winding separately. The controller is configured for adjusting the reactance value of the control winding and/or the reactance value of the short-circuit winding and adjusting the reactance value of the working winding so as to control the current of the first control loop. Accordingly, the reactance of the working winding is adjusted by using the controller to implement the coarse adjustment of the reactance of the short-circuit winding and the fine adjustment of the reactance of the control winding, thereby adjusting the current of the first control loop so as to achieve the effect of no power outage when the ice on a power transmission line is melted.

Embodiment Two

Figure 2:
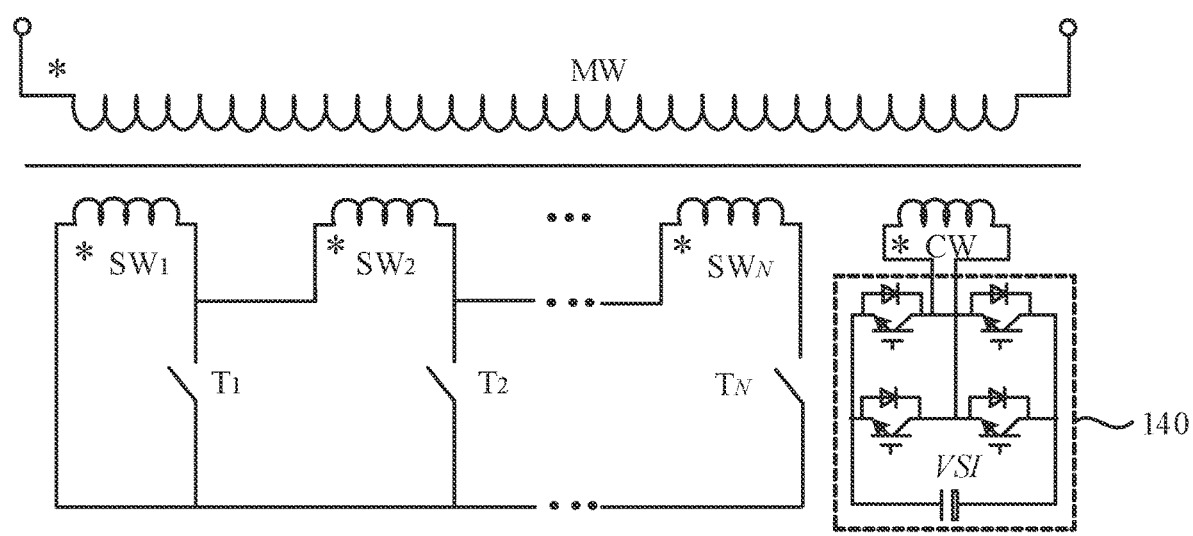
FIG. 2 is a diagram illustrating the structure of the adjustable reactor of the online ice melting apparatus according to embodiment two of the present application.

FIG. 2 is a diagram illustrating the structure of the adjustable reactor of the online ice melting apparatus according to embodiment two of the present application. Referring to FIG. 2, the working winding includes a primary coil winding MW. The control winding includes a first secondary coil winding CW. The short-circuit winding includes a plurality of second secondary coil windings, for example, SW1, SW2, . . . , and SWN that are shown in the figure. The primary coil winding MW is connected between the grounding transformer 200 and the auxiliary circuit 400. A series connection is arranged sequentially between each second secondary coil winding. The first secondary coil winding CW and the second secondary coil windings are electrically connected to the controller 300 separately.

A first terminal of the primary coil winding 1\4W is electrically connected to the grounding transformer 200. A second terminal (the terminal labeled with an asterisk (*) in the figure) of the primary coil winding MW is electrically connected to the auxiliary circuit 400. Referring to FIG. 2, second secondary coil winding SW1, second secondary coil winding SW2, . . . , and second secondary coil winding SWN are sequentially connected end to end to form a series connection. A terminal with an asterisk (*) is a head end or an inlet end.

Optionally, referring to FIG. 2, the adjustable reactor 100 further includes an inverter circuit 140 and a plurality of controllable switches, for example, switch T1, switch T2, . . . , and switch TN that are shown in FIG. 2. An input terminal of the inverter circuit 140 is electrically connected to the controller. An output terminal of the inverter circuit 140 is electrically connected to the first secondary coil winding CW. The second secondary coil windings are sequentially connected to each other in series. An outlet terminal of each second secondary coil winding is electrically connected to a first terminal of one controllable switch. A second terminal of each controllable switch is electrically connected to an inlet end of a first second secondary coil winding. A control terminal of each controllable switch is electrically connected to the controller.

Referring to FIG. 2, second secondary coil winding SW1, second secondary coil winding SW2, . . . , and second secondary coil winding SWN are sequentially connected end to end to form a series connection. An outlet terminal (the terminal with no asterisk (*) in the figure) of second secondary coil winding SW1 is electrically connected to a first terminal of controllable switch T1. An outlet terminal (the terminal with no asterisk (*) in the figure) of second secondary coil winding SW2 is electrically connected to a first terminal of controllable switch T2. An outlet terminal (the terminal with no asterisk (*) in the figure) of second secondary coil winding SWN is electrically connected to a first terminal of controllable switch TN. A second terminal of controllable switch T1, a second terminal of controllable switch T2, . . . , and a second terminal of controllable switch TN are electrically connected to an inlet end (the terminal with an asterisk (*) in the figure) of second secondary coil winding SW1.

Optionally, the online ice melting apparatus further includes a current detection module. The current detection module is electrically connected to the primary coil winding, the first secondary coil winding, the second secondary coil windings, and the controller. The current detection module is configured for detecting currents of the primary coil winding, the first secondary coil winding, and the second secondary coil windings.

The current detection module may be, for example, a current transformer, a Hall current sensor, or a current detector.

Optionally, referring to FIG. 1, the grounding transformer 200 includes a first inductor L1, a second inductor L2, and a third inductor L3. A first terminal of the first inductor L1, a first terminal of the second inductor L2, and a first terminal of the third inductor L3 are electrically connected to the auxiliary circuit 400 separately. A second terminal of the first inductor L1, a second terminal of the second inductor L2, and a second terminal of the third inductor L3 are electrically connected to a first terminal of the working winding 110 separately. A second terminal of the working winding 110 is grounded.

The grounding transformer 200 is configured for providing a neutral point for the adjustable reactor 100. The current of the first control loop is adjusted by adjusting the reactance value at the neutral point through the adjustable reactor 100; that is, the ice melting current of a power transmission line is adjusted to implement online ice melting for the power transmission line. The neutral point is the intersection of the second terminal of the first inductor L1, the second terminal of the second inductor L2, and the second terminal of the third inductor L3.

Optionally, referring to FIG. 1, the auxiliary circuit 700 includes a fourth inductor L4, a fifth inductor L5, a first resistor R1, a second resistor R2, a lightning wire L0, and the three-phase line. The three-phase line includes the first-phase line La, the second-phase line Lb, and the third-phase line Lc. A first terminal of the fourth inductor L4 is electrically connected to the second terminal of the adjustable reactor 100. A second terminal of the fourth inductor L4 is electrically connected to a first terminal of the first resistor R1. The lightning wire L0 is connected between a second terminal of the first resistor R1 and a first terminal of the fifth inductor L5. The lightning wire L0 is grounded. A second terminal of the fifth inductor L5 is electrically connected to a first terminal of the second resistor R2. A second terminal of the second resistor R2 is electrically connected to any phase of the three-phase line. The second terminal of the second resistor R2 is grounded.

In the related line ice melting technology, the alternate-current short-circuit ice melting method is the most economical and effective; however, the related line ice melting technology is mainly aimed at main network lines. Distribution network lines are widely distributed with a great number of branches and complicated types of lines, are located in harsh terrain and climate conditions, and mostly pass through the micro-topographic and micro-climatic regions that are easily coated with ice. Accordingly, the distribution network lines have become a difficulty in the prevention and treatment of ice disasters.

Embodiments of the present application provide an online ice melting apparatus. Referring to FIG. 1, FIG. 1 illustrates the connection point D between the third-phase line Lc of the three-phase line and the second terminal of the second resistor R2. A switch may be arranged at the connection point D to control the third-phase line Lc and the second terminal of the second resistor R2 to be connected or disconnected. That is, it illustrates the first control loop formed by the third-phase line Lc, grounding transformer 200, the working winding 110, the fourth inductor L4, the fifth inductor L5, the first resistor R1, the second resistor R2, and the lightning wire L0. The current of the first control loop is adjusted by adjusting the reactance of the working winding 110 so as to implement online ice melting for the icing on the third-phase line Lc. Optionally, the arrangement may also be that the second terminal of the second resistor R2 is only connected to the first-phase line La through a switch to form the first control loop or only connected to the second-phase line Lb through a switch to form the first control loop. It may be that the second terminal of the second resistor R2 is connected to, for example, another branch in the power grid through a switch to form the first control loop. Online ice melting may be implemented separately for the first-phase line La, the second-phase line Lb, or another branch in the power grid according to actual icing situations and ice melting requirements. Accordingly, it solves the problem of difficulty in melting the ice on the distribution network lines due to factors including the wide distribution of lines, a great number of branches, and complicated types of lines.

Optionally, referring to FIG. 1, the online ice melting apparatus further includes a change-over switch 510 and a non-grounded module 520. The grounding transformer 200 is electrically connected to the three-phase line through the change-over switch 510. The non-grounded module 520 is electrically connected to the three-phase line through the change-over switch 510. The change-over switch 510 is configured for controlling the three-phase line to be electrically connected to the grounding transformer 200 or the non-grounded module 520.

The change-over switch 510 may be an intelligent knife switch. Normally, that is, when the ice on a line does not need to be melted, the non-grounded module 520 is electrically connected to the three-phase line through the change-over switch 510. When the ice needs to be melted, the grounding transformer 200 is electrically connected to the three-phase line through the change-over switch 510 so that the grounding transformer 200, the adjustable reactor 100, and the auxiliary circuit form the first control loop.

Optionally, with continued reference to FIG. 1, the non-grounded module 520 includes a sixth inductor L6, a seventh inductor L7, an eighth inductor L8, a ninth inductor L9, a tenth inductor L10, an eleventh inductor L11, and a third resistor R3. The change-over switch 510 includes a first contact 1, a second contact 2, a third contact 3, a fourth contact 4, a fifth contact 5, and a sixth contact 6. The grounding transformer 200 includes the first inductor L1, the second inductor L2, and the third inductor L3. The first terminal of the first inductor L1 is electrically connected to the first contact 1. The first terminal of the second inductor L2 is electrically connected to the third contact 3. The first terminal of the third inductor L3 is electrically connected to the fifth contact 5.

A first terminal of the sixth inductor L6 is electrically connected to the second contact 2. A second terminal of the sixth inductor L6 is electrically connected to a first terminal of the seventh inductor L7. A second terminal of the seventh inductor L7 is electrically connected to a first terminal of the third resistor R3. A first terminal of the eighth inductor L8 is electrically connected to the fourth contact 4. A second terminal of the eighth inductor L8 is electrically connected to a first terminal of the ninth inductor L9. A second terminal of the ninth inductor L9 is electrically connected to the first terminal of the third resistor R3. A first terminal of the tenth inductor L10 is electrically connected to the sixth contact 6. A second terminal of the tenth inductor L10 is electrically connected to a first terminal of the eleventh inductor L11. A second terminal of the eleventh inductor L11 is electrically connected to the first terminal of the third resistor R3. A second terminal of the third resistor R3 is grounded.

Optionally, referring to FIG. 1, the online ice melting apparatus further includes a three-phase power supply end 530, a line impedance module 550, and a load module 540. One end of the three-phase line is electrically connected to the three-phase power supply end 530. The other end of the three-phase line is electrically connected to the load module 540. The line impedance module 550 is connected on the three-phase line between the three-phase power supply end 530 and the load module 540.

Referring to FIG. 1, the three-phase power supply end 530 includes a first-phase power supply end A, a second-phase power supply end B, and a third-phase power supply end C. The three-phase line includes the first-phase line La, the second-phase line Lb, and the third-phase line Lc. The first-phase line La is connected between the first-phase power supply end A and the load module 540. The second-phase line Lb is connected between the second-phase power supply end B and the load module 540. The third-phase line Lc is connected between the third-phase power supply end C and the load module 540.

Optionally, still referring to FIG. 1, the online ice melting apparatus further includes a first capacitor C1, a second capacitor C2, and a third capacitor C3. The three-phase line includes the first-phase line La, the second-phase line Lb, and the third-phase line Lc. A first terminal of the first capacitor C1 is electrically connected to the first-phase line La. A second terminal of the first capacitor C1 is grounded. A first terminal of the second capacitor C2 is electrically connected to the second-phase line Lb. A second terminal of the second capacitor C2 is grounded. A first terminal of the third capacitor C3 is electrically connected to the third-phase circuit Lc. A second terminal of the third capacitor C3 is grounded.

In the technical solutions of this embodiment, the implementation process of the online ice melting apparatus includes the following. Referring to FIGS. 1 and 2, when the ice of the third-phase line Lc needs to be melted, the grounding transformer 200 is connected to the three-phase line, the switch on the third-phase line Lc may be configured for controlling the connection point D between the third-phase line Lc and the auxiliary circuit 400 to be connected so that the auxiliary circuit 400 is connected between the second terminal of the primary coil winding MW and the third-phase line Lc, thereby enabling the grounding transformer 200, the primary coil winding MW, and the line of any phase of the three-phase line to form the first control loop 600. The first terminal of the primary coil winding MW is electrically connected to the grounding transformer 200, the second terminal of the primary coil winding MW is electrically connected to the auxiliary circuit 400; the grounding transformer 200, the primary coil winding MW, the auxiliary circuit 400, and the third-phase line Lc form the first control loop 600. The controller 300 controls one of the controllable switches to be turned on (which specific switch to be turned on is set according to the reactance corresponding to the ice melting current actually required) so that one or more second secondary coil windings are connected in series (the number of the second secondary coil windings connected in series may be set according to the ice melting current actually required); accordingly, the reactance of the primary coil winding 1\4W changes following the connection of the lines of the second secondary coil windings so that the reactance of the working winding is close to the target ice melting current of the first control loop; that is, the coarse adjustment is implemented.

According to the difference between the actual current of the first control loop detected by the current detection module after the coarse adjustment and the target ice melting current, the controller adjusts the reactance of the first secondary coil winding CW through the inverter circuit 140. The main coil winding MW changes correspondingly along with the change of the reactance of the first secondary coil winding CW. The controller continuously performs adjustment for the first secondary coil winding CW until the current of the first control loop meets the target ice melting current; that is, the fine adjustment is implemented. The implementation process of the fine adjustment may be as below.

Figure 3:
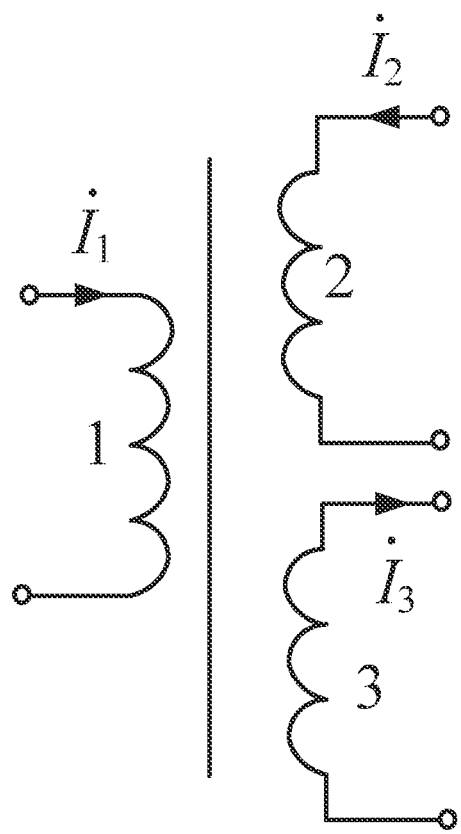
FIG. 3 is a diagram of an equivalent winding of the adjustable reactor of the online ice melting apparatus according to embodiment two of the present application.
Figure 4:
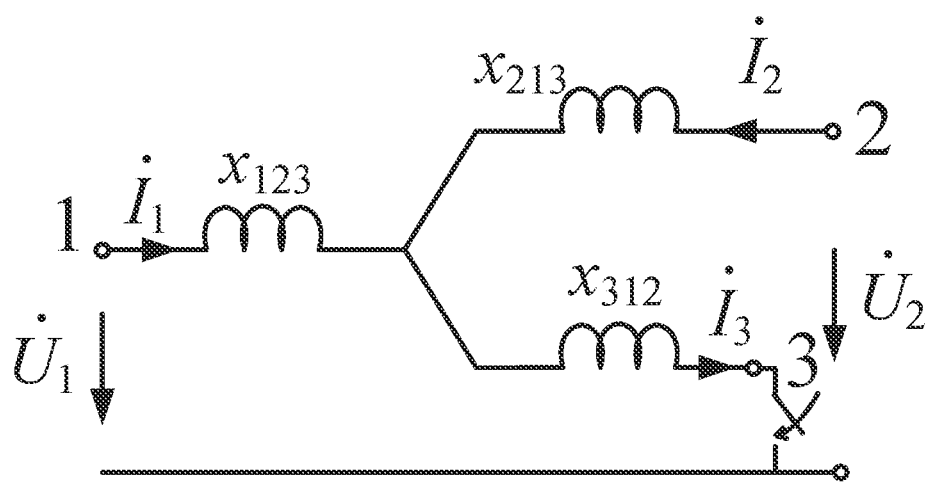
FIG. 4 is a diagram in which the adjustable reactor of the online ice melting apparatus according to embodiment two of the present application is equivalent to a circuit of the three-ray type.

Since the short-circuit windings are connected in series during operation, the short-circuit windings may be studied as a whole with internal operation parameters not considered. In this case, the body of the adjustable reactor is equivalent to a three-winding transformer during operation, that is, a transformer with a working winding, a control winding and a short-circuit winding. FIG. 3 is a diagram of an equivalent winding of the adjustable reactor of the online ice melting apparatus according to embodiment two of the present application. FIG. 4 is a diagram in which the adjustable reactor of the online ice melting apparatus according to embodiment two of the present application is equivalent to a circuit of the three-ray type. In FIG. 3, the port number of the working winding, the port number of the control winding, and the port number of the short-circuit winding are defined as 1, 2, and 3 respectively. If an exciting current is neglected, an equation $\dot{I}_1+\dot{I}_2=\dot{I}_3$ is satisfied. Referring to FIG. 4, it can be equivalent to one circuit of the three-ray type. In FIG. 4, $x_{123}$, $x_{213}$, and $x_{312}$ are each the equivalent reactance of the three windings. The parameters are obtained through the formulas below.

$$\begin{cases} x_{123} = w(L_{11} - M_{12} - M_{13} + M_{23}) \\ x_{213} = w(L_{22} - L_{12} - M_{23} + M_{13}) \\ x_{312} = w(L_{33} - M_{13} - M_{23} + M_{12}) \end{cases}$$

L11, L22, and L33 are each the self-inductance of one of the three windings. M12, M23, M13 are each the mutual-inductance between two of the three windings.

Referring to FIG. 4, if any one of the three windings is open-circuited and the other pair of windings is short-circuited with the operation state equivalent to that of a double-winding transformer, then $x_{1\text{-}2}$ $x_{2\text{-}3}=x_{213}$, $x_{1\text{-}3}=x_{123}+x_{312}$, and $x_{2\text{-}3}=x_{213}+x_{312}$. $x_{1\text{-}2}$, $x_{1\text{-}3}$, and $x_{2\text{-}3}$ are each the short-circuit reactance between two of the three windings. Here all windings are converted to the same number of turns. In this case, the equivalent reactance parameters in FIG. 4 may be determined as below through the short-circuit reactance $x_{1\text{-}2}$, the short-circuit reactance $x_{1\text{-}3}$, and the short-circuit reactance $x_{2\text{-}3}$.

$$\begin{cases} x_{123} = \dfrac{x_{1\text{-}2} + x_{1\text{-}3} - x_{2\text{-}3}}{2} \\ x_{213} = \dfrac{x_{1\text{-}2} + x_{2\text{-}3} - x_{1\text{-}3}}{2} \\ x_{312} = \dfrac{x_{1\text{-}3} + x_{2\text{-}3} - x_{1\text{-}2}}{2} \end{cases}$$

The formula below is obtained when port 3 is short-circuited, the current of port 2 is controlled, and the current of port 2 and the current of port 1 have a relationship that $\dot{I}_1=\alpha \dot{I}_2$:

$$\dot{U}_1=jx_{123}\dot{I}_1+jx_{312}(\dot{I}_1+\dot{I}_2)=j\dot{I}_1[x_{123}+x_{312}(1+\alpha)]$$

Similarly, the reactance expression of port 1 is obtained as below.

$$x_L = x_{123} + (1+\alpha)x_{312} = x_{1-3} + \alpha x_{312}$$

Accordingly, when the degree α of reactance control changes, the reactance value $x_L$ of the working port can be adjusted up and down on the basis of $x_{1-3}$, which is the "continuous adjustment". When a combination of the switches T1 to TN changes, a series of different values of $x_{1-3}$ may be obtained, that is, values of $x_{1-3}$ may be selected from $x_{1-3(1)}$ to $x_{1-3(N)}$, which is the "graded adjustment". Accordingly, the two types of adjustment are matched to implement the continuous adjustment of the reactance $x_L$ in a relatively large range, thereby enabling the ice on a power transmission line to be melted continuously.

Similarly, when the ice of the first-phase line La, the ice of the second-phase line Lb, or the ice of another line needs to be melted, the grounding transformer 200 is connected to the three-phase line; the switch on the first-phase line La, the switch on the second-phase line Lb, or the switch on another line may be configured for controlling the connection point between the corresponding line and the auxiliary circuit 400 to be connected so that the auxiliary circuit 400 is connected between the second terminal of the primary coil winding 1\4W and the corresponding line whose ice is to be melted, thereby enabling that the grounding transformer 200, the adjustable reactor 100, the auxiliary circuit 400, and the corresponding line whose ice is to be melted form the first control loop. Then online melting is implemented for the line whose ice is to be melted according to the preceding implementation process.

In the technical solutions of this embodiment, the present application provides an online ice melting apparatus. The apparatus is configured for melting the ice on a three-phase line. The apparatus includes an adjustable reactor, a grounding transformer, a controller, and an auxiliary circuit. The grounding transformer is electrically connected to the three-phase line and a first terminal of the adjustable reactor separately. The auxiliary circuit is connected between a second terminal of the adjustable reactor and a line of any phase of the three-phase line. The grounding transformer, the adjustable reactor, the auxiliary circuit, and the line of any phase of the three-phase line form a first control loop. The adjustable reactor includes a working winding, a control winding, and a short-circuit winding. The working winding is connected between the grounding transformer and the auxiliary circuit. The controller is electrically connected to the control winding and the short-circuit winding separately. The controller is configured for adjusting the reactance value of the control winding and/or the reactance value of the short-circuit winding and adjusting the reactance value of the working winding so as to control the current of the first control loop. Accordingly, the reactance of the working winding is adjusted by using the controller to implement the coarse adjustment of the reactance of the short-circuit winding and the fine adjustment of the reactance of the control winding, thereby adjusting the current of the first control loop so as to achieve the effect of no power outage when the ice on a power transmission line is melted.

What is claimed is:

1. An online ice melting apparatus, applied for melting ice on a three-phase line, comprising an adjustable reactor, a grounding transformer, a controller, and an auxiliary circuit;
wherein the grounding transformer is electrically connected to the three-phase line and a first terminal of the adjustable reactor separately, the auxiliary circuit is connected between a second terminal of the adjustable reactor and a line of any phase of the three-phase line, and the grounding transformer, the adjustable reactor, the auxiliary circuit, and the line of the any phase of the three-phase line form a first control loop; and
wherein the adjustable reactor comprises a working winding, a control winding, and a short-circuit winding; the working winding is connected between the grounding transformer and the auxiliary circuit, the controller is electrically connected to the control winding and the short-circuit winding separately, and the controller is configured for adjusting a reactance value of the control winding and/or a reactance value of the short-circuit winding to adjust a reactance value of the working winding so as to control a current of the first control loop.

2. The online ice melting apparatus according to claim 1, wherein the working winding comprises a primary coil winding, the control winding comprises a first secondary coil winding, and the short-circuit winding comprises a plurality of second secondary coil windings;
wherein the primary coil winding is connected between the grounding transformer and the auxiliary circuit, the plurality of second secondary coil windings are sequentially connected to each other in series, and the first secondary coil winding and the plurality of second secondary coil windings are electrically connected to the controller separately.

3. The online ice melting apparatus according to claim 2, wherein the adjustable reactor further comprises an inverter circuit and a plurality of controllable switches;
wherein an input terminal of the inverter circuit is electrically connected to the controller, an output terminal of the inverter circuit is electrically connected to the first secondary coil winding, the plurality of second secondary coil windings are sequentially connected to each other in series, an outlet terminal of each second secondary coil winding of the plurality of second secondary coil windings is electrically connected to a first terminal of one controllable switch of the plurality of controllable switches, a second terminal of each controllable switch of the plurality of controllable switches is electrically connected to an inlet end of a first second secondary coil winding of the plurality of second secondary coil windings, and a control terminal of the each controllable switch is electrically connected to the controller.

4. The online ice melting apparatus according to claim 2, further comprising a current detection module, wherein the primary coil winding, the first secondary coil winding, the plurality of second secondary coil windings, and the controller are electrically connected to the current detection module; and the current detection module is configured for detecting currents of the primary coil winding, the first secondary coil winding, and the plurality of second secondary coil windings.

5. The online ice melting apparatus according to claim 1, wherein the grounding transformer comprises a first inductor, a second inductor, and a third inductor;
wherein a first terminal of the first inductor, a first terminal of the second inductor, and a first terminal of the third inductor are electrically connected to the auxiliary circuit separately;
wherein a second terminal of the first inductor, a second terminal of the second inductor, and a second terminal of the third inductor are electrically connected to a first terminal of the working winding separately, and a second terminal of the working winding is grounded.

6. The online ice melting apparatus according to claim 1, wherein the auxiliary circuit comprises a fourth inductor, a fifth inductor, a first resistor, a second resistor, and a lightning wire, wherein a first terminal of the fourth inductor is electrically connected to a second terminal of the working winding, a second terminal of the fourth inductor is electrically connected to a first terminal of the first resistor, the lightning wire is connected between a second terminal of the first resistor and a first terminal of the fifth inductor, the lightning wire is grounded, a second terminal of the fifth inductor is electrically connected to a first terminal of the second resistor, a second terminal of the second resistor is electrically connected to the any phase of the three-phase line, and the second terminal of the second resistor is grounded.

7. The online ice melting apparatus according to claim 1, further comprising a change-over switch and a non-grounded module;
wherein the grounding transformer is electrically connected to the three-phase line through the change-over switch, the non-grounded module is electrically connected to the three-phase line through the change-over switch, and the change-over switch is configured for controlling the three-phase line to be electrically connected to the grounding transformer or the non-grounded module.

8. The online ice melting apparatus according to claim 7, wherein the non-grounded module comprises a sixth inductor, a seventh inductor, an eighth inductor, a ninth inductor, a tenth inductor, an eleventh inductor, and a third resistor;
wherein the change-over switch comprises a first contact, a second contact, a third contact, a fourth contact, a fifth contact, and a sixth contact; and the grounding transformer comprises a first inductor, a second inductor, and a third inductor;
wherein a first terminal of the first inductor is electrically connected to the first contact, a first terminal of the second inductor is electrically connected to the third contact, a first terminal of the third inductor is electrically connected to the fifth contact, a first terminal of the sixth inductor is electrically connected to the second contact, a second terminal of the sixth inductor is electrically connected to a first terminal of the seventh inductor, a second terminal of the seventh inductor is electrically connected to a first terminal of the third resistor, a first terminal of the eighth inductor is electrically connected to the fourth contact, a second terminal of the eighth inductor is electrically connected to a first terminal of the ninth inductor, a second terminal of the ninth inductor is electrically connected to the first terminal of the third resistor, a first terminal of the tenth inductor is electrically connected to the sixth contact, a second terminal of the tenth inductor is electrically connected to a first terminal of the eleventh inductor, a second terminal of the eleventh inductor is electrically connected to the first terminal of the third resistor, and a second terminal of the third resistor is grounded.

9. The online ice melting apparatus according to claim 1, further comprising a three-phase power supply end, a line impedance module, and a load module;
wherein one end of the three-phase line is electrically connected to the three-phase power supply end, another end of the three-phase line is electrically connected to the load module, and the line impedance module is connected on the three-phase line between the three-phase power supply end and the load module.

10. The online ice melting apparatus according to claim 1, further comprising a first capacitor, a second capacitor, and a third capacitor;
wherein the three-phase line comprises a first-phase line, a second-phase line, and a third-phase line;
wherein a first terminal of the first capacitor is electrically connected to the first-phase line, a second terminal of the first capacitor is grounded, a first terminal of the second capacitor is electrically connected to the second-phase line, a second terminal of the second capacitor is grounded, a first terminal of the third capacitor is electrically connected to the third-phase circuit, and a second terminal of the third capacitor is grounded.

* * * * *